US008894418B2

(12) United States Patent
Perkinson et al.

(10) Patent No.: US 8,894,418 B2
(45) Date of Patent: Nov. 25, 2014

(54) RETRACTABLE CONTACT ASSEMBLY

(71) Applicants: Robert H. Perkinson, Stonington, CT (US); David R. Danielson, Suffield, CT (US)

(72) Inventors: Robert H. Perkinson, Stonington, CT (US); David R. Danielson, Suffield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 77 days.

(21) Appl. No.: 13/661,852

(22) Filed: Oct. 26, 2012

(65) Prior Publication Data

US 2014/0120744 A1 May 1, 2014

(51) Int. Cl.
*H01R 39/00* (2006.01)

(52) U.S. Cl.
USPC ............................................. 439/29; 439/18

(58) Field of Classification Search
USPC .............. 439/29, 22, 23, 25, 30, 18; 310/232, 310/240
See application file for complete search history.

(56) References Cited

U.S. PATENT DOCUMENTS

| | | | | |
|---|---|---|---|---|
| 3,059,202 A | * | 10/1962 | Huber | 439/23 |
| 4,799,544 A | * | 1/1989 | Curlett | 166/65.1 |
| 6,071,125 A | * | 6/2000 | Shiozawa | 439/26 |
| 7,163,403 B1 | * | 1/2007 | Klotzle et al. | 439/23 |

FOREIGN PATENT DOCUMENTS

| | | |
|---|---|---|
| EP | 0099158 A1 | 1/1984 |
| WO | 9008695 A1 | 8/1990 |

OTHER PUBLICATIONS

Search Report for related GB Application No. GB1318561.6, dated Apr. 7, 2014, pp. 1-3.

* cited by examiner

*Primary Examiner* — Hae Moon Hyeon
(74) *Attorney, Agent, or Firm* — Cantor Colburn LLP

(57) ABSTRACT

A retractable contact assembly includes an outer casing having a first opening and a piston located in the first opening of the outer casing and moveable axially within the opening. The piston has a second opening. The assembly further includes an inelastic force generating device configured to control an axial movement of the piston and a contact located in the second opening of the piston and movable axially in the second opening of the piston. The assembly further includes an elastic force biasing device configured to provide an elastic force to the contact in an axial direction outward from the second opening.

19 Claims, 4 Drawing Sheets

RETRACTABLE CONTACT ASSEMBLY

BACKGROUND OF THE INVENTION

Embodiments of the present disclosure relate to an electrical retractable contact assembly, and in particular to an electrical contact, such as a conductive brush, positioned within a retractable piston.

Conventional brush and slip ring assemblies supply electrical power from a brush to a slip ring positioned around a rotating shaft, such as may be used to electrically provide de-icing power to a rotating propeller. However, conventional assemblies suffer from rapid wear and require frequent replacement of the brushes and/or the slip rings. In addition, typical brush and ring systems generate considerable debris, since the brushes are in constant contact with the ring. In addition, in some systems, such as de-icing systems, power is required only occasionally. However, since the brushes are in constant contact with the ring, even when power is not required, the brushes may wear down unnecessarily.

BRIEF DESCRIPTION OF THE INVENTION

Embodiments of the present disclosure relate to a retractable contact assembly including an outer casing having a first opening and a piston located in the first opening of the outer casing and moveable axially within the opening. The piston may have a second opening. The retractable contact assembly includes an inelastic-force generating device configured to control an axial position of the piston among an extended position and a retracted position and a contact located in the second opening of the piston and movable axially in the second opening of the piston. The device also includes an elastic-force biasing device configured to provide an elastic force to the contact in an axial direction outward from the second opening.

Embodiments of the present disclosure further relate to a contact position control system including a rotating armature and a retractable contact assembly. The retractable contact assembly includes an outer casing, a piston movable axially within the outer casing, and a contact movable axially within the piston. The contact is biased towards the rotating armature by an elastic-force biasing device. The system further includes an inelastic-force generating device configured to provide an inelastic force to the piston to control an axial position of the piston with respect to the outer casing between an extended axial position and a retracted axial position.

Embodiments of the present disclosure further relate to a method of controlling a contact position. The method includes providing an elastic force to bias a contact toward a first axial direction, where the contact is located partially within an opening of a piston and moveable axially within the opening of the piston. The method also includes providing an inelastic force to move the piston axially within an opening of an outer casing between an extended position and a retracted position.

BRIEF DESCRIPTION OF THE DRAWINGS

The following descriptions should not be considered limiting. With reference to the accompanying drawings, like elements are numbered alike.

DETAILED DESCRIPTION OF THE INVENTION

Conventional brush and ring assemblies wear rapidly and require frequent replacement of parts. Embodiments of the present disclosure relate to a retractable contact assembly for removing from the surface of a ring the brush when the brush is not required to transfer electricity.

Figure 1:
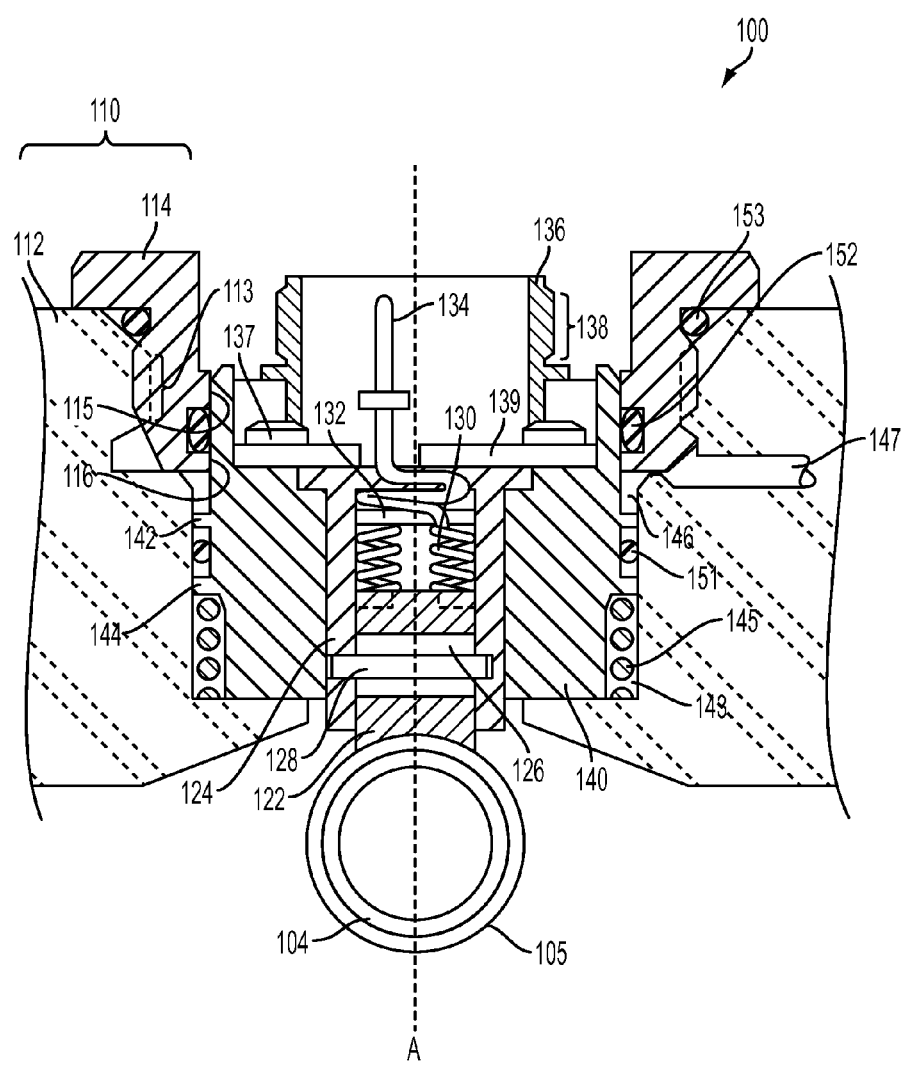
FIG. 1 is a cross-sectional view of a retractable contact assembly according to an embodiment of the present disclosure.

FIG. 1 illustrates a retractable contact assembly 100 according to an embodiment of the present disclosure. The assembly 100 includes an outer casing 110, a piston 140 located within the outer casing 110, and one or more contacts 122, such as a brush, located at least partially within the piston 140. The piston 140 is retractable within the outer casing 110 to move the contact 122 axially (along axis A) towards or away from an armature 104 including a slip ring 105 located around an outside circumference of the armature 104 or in a groove formed in the armature 104, for example. In one embodiment, the contact 122 is a brush. For example, the contact 122 may be a conductive brush. For purposes of description of one embodiment, the present disclosure may refer to a conductive brush 122 or a brush 122, although embodiments encompass any type of contact and are not limited to brushes. In operation, the brush 122 contacts the slip ring 105 to provide electrical power to a device or material on the armature 104, such as, for example, a field winding or a resistance heating element (not shown).

The outer casing 110 may include a frame 112, which may be a vehicle body, vehicle frame, or a body or frame of a fixed structure. The outer casing 110 may further include a retainer 114 affixed to the frame 112. The retainer 114 may be fixed to the frame 112 by a threaded portion 113 or by any other fixing mechanism, such as welds, screws, latches or bolts. A seal 153, such as an O-ring, may be positioned in a cavity defined by a radially-outward-facing surface of the retainer 114 and a radially-inward-facing surface of the frame 112 to maintain a fluid-tight seal.

The piston 140 is located in an opening in the outer casing 110. In one embodiment, the retainer 114 includes one or more protrusions 115 and 116 having radially-inward-facing surfaces configured to contact, or to be positioned adjacent to, an outwardly-facing surface of the piston 140. A seal 152 may be positioned in a cavity defined by the protrusions 115 and 116 and an outer surface of the piston 140. The seal 152 may form a fluid-tight seal. The outer surface of the piston 140 and the inner surface of the retainer 114, such as at the radially-inward-facing surfaces of the protrusions 115 and 116 may be in sliding contact with each other. In other words, the protrusions, in combination with or independently of, the seal 152 may stabilize the piston 140 and maintain the piston 140 in radial directions while permitting movement of the piston 140 in an axial direction (A) while the seal 152 prevents leakage of pressurized hydraulic fluid to the atmosphere.

In addition, the piston 140 may include on or more protrusions 142 and 144 having radially-outward-facing surfaces configured to contact, or to be positioned adjacent to, a radially-inward-facing surface of the frame 112. A seal 151 may be positioned in a cavity defined by the protrusions 142 and 144 and an inner surface of the frame 112. The seal 151 may form a fluid-tight seal. The radially-outward-facing surfaces of the protrusions 142 and 144 and the radially-inward-facing surface of the frame 112 may be in sliding contact with each other. In other words, the protrusions 142 and 144, in combination with or independently of, the seal 151 may stabilize the piston 140 and maintain the piston 140 in radial directions while permitting movement of the piston 140 in an axial direction (A) relative to the frame 112, while the seal 151 prevents leakage of pressurized hydraulic fluid.

In one embodiment, a cavity 146 is formed between protrusions from the piston 140 and protrusions from the outer casing 110. Fluid is supplied to the cavity 146 and a position of the piston 140 in an axial direction (A) is controlled according to a pressure of the fluid. In particular, the protrusion 116 and the protrusion 142 define opposing side walls of the cavity 146. A radially-outward-facing surface of the piston 140 and a radially-inward-facing surface of the frame 112 also define opposing side wall of the cavity 146. A fluid conduit 147 is connected to the cavity 146. When fluid is supplied to the cavity 146, or when a fluid pressure of fluid in the cavity 146 is increased, the fluid presses against the protrusions 116 and 142, and the protrusions 116 and 142 are separated from each other, causing the piston 140 to slide in the axial direction (A) away from the retainer 114 and toward the armature 105 into an extended position. When the fluid pressure is decreased in the cavity 146, the piston 140 slides toward the retainer 114 and away from the slip ring 105/armature 104. Accordingly, the brush 122 may be brought into contact with the slip ring 105 when desired and removed from contact when not needed.

In one embodiment, the piston 140 is biased away from the armature 104 and toward the retainer 114 by a spring 145 or other biasing mechanism located in a cavity 143 between the piston 140 and the frame 112.

In one embodiment, one or more conductive brushes 122 may be located in a cavity in the piston 140. The brush 122 may be biased away from the retainer 114 and towards the armature 104 by springs 130 or other biasing mechanisms. A spring board 132 may be provided to provide a fixed surface against which the springs 130 or other biasing mechanisms may exert force. The brush 122 may be positioned within a sleeve 124, and the sleeve 124 may be positioned in the cavity of the piston 140. The sleeve 124 may be fixed with respect to the piston 140 so that the sleeve 124 cannot move with respect to the piston 140. In one embodiment, a radially-outward-facing surface of the sleeve is in contact with a radially-inward-facing surface of the piston 140, and the sleeve 124 is secured with respect to the piston 140 by a panel 139 and screws 137 or bolts. However, although screws 137 and a panel 139 are illustrated as fixing the sleeve 124 to the piston 140 in FIG. 1, embodiments of the present disclosure encompass any means or mechanism for fixing the sleeve 124 to the piston 140, including adhesives, welds, etc.

The brush 122 may include a cavity 126 located apart from an end of the brush 122, and a pin 128 may extend through the cavity 126. The pin 128 may be connected at each end to the sleeve 124. The pin 128 may prevent the brush 122 from being pushed too far towards the retainer 114 and from extending too far outward in the direction of the armature 105.

The assembly 100 includes an electrical connector 136 including threads 138 or other fixing means or mechanisms to connect to electrical cabling or wiring. An electrical pin 134 extends into the connector and is in electrical contact with the brush 122 to allow current to flow from a cable to the pin 134, from the pin 134 to the brush 122, and from the brush 122 to the slip ring 105. The slip ring 105 may be connected to one or more rotating electrical systems, such as a de-icing system of a rotor blade.

In operation, the piston 140 may be placed in a retracted position by decreasing the fluid pressure in the cavity 146. The springs 145 provide an axial bias of the piston 140 toward the retainer 114, and the retraction of the piston 140 may cause the brush 122 to be separated from the slip ring 105. The pin 128 may prevent the brush 122 from extending too far in the axial direction (A) away from the retainer 114. A fluid pressure may be increased to the cavity 146, exerting pressure against the protrusion 142 of the slideable piston 140 and causing the piston 140 to move axially away from the retainer 114. The brush 122 may accordingly be placed in an extended position to come into contact with the slip ring 105, and the fluid pressure may be maintained constant to maintain the brush 122 in contact with the slip ring 105. Electrical power may be provided to the slip ring 105 via the brush 122, and the brush may be retracted upon determining that electrical power to the slip ring 105 is no longer needed.

In one embodiment, the brush 122 is maintained against the slip ring 105 by the biasing force of the springs 130, and not by the force of the fluid in the cavity 146. In other words, the fluid pressure in the cavity 146 may be controlled to position the brush 122 against the slip ring 105 while maintaining the body of the piston 140 separated from the slip ring 105. In addition, the fluid pressure in the cavity 146 may be controlled to position the brush 122 against the slip ring 105 without pressing the pin 128 presses against a surface of the cavity 126.

In other words, embodiments of the present disclosure utilize a first, controllable and adjustable force to position the piston 140 and a second, elastic force to maintain a pressure of the brush 122 against the slip ring 105. The elastic force generated by the spring 130 may cause the brush 122 to maintain contact with the slip ring 105 even in the case of vibration or unevenness of the slip ring 105.

While one particular configuration of the retractable contact assembly 100 has been provided in FIG. 1, embodiments of the present disclosure encompass any variation for providing a retractable brush using a controllable force and an elastic force. For example, in one embodiment a spring may be located at an end of the piston 140 adjacent to the retainer 114 to bias the piston 140 toward the retainer 114, and increasing fluid pressure may expand the spring instead of compressing the spring. In another embodiment, the piston 140 may be biased away from the retainer 114 and the increase in fluid pressure may slide the piston 140 away from the armature 105 and toward the retainer 114. In such an embodiment, the location of the protrusions 142 and 144 of the piston 140 may be switched with the location of the protrusions 115 and 116 on the retainer 114.

In other embodiments, the retainer 114 may extend all the way through the frame 112, such that no portion of the frame 112 contacts the piston 140. In such an embodiment, the retainer 114 may include an opening to receive the fluid in a cavity defined by the retainer 114 and the piston 140. In another embodiment, no retainer 114 may be provided, and the piston 140 and electrical connector 136 may be installed directly into an opening in the frame 112. In one embodiment, the retainer 114 may have a substantially annular shape and the piston 140 may have a substantially cylindrical shape. In addition, the protrusions 115, 116, 142 and 144 may have substantially annular shapes. However, embodiments of the present disclosure encompass a retractable contact assembly 100 having any shape.

While movement of the brush 122 and piston 140 have been described in FIG. 1 with respect to movement towards and away from the retainer 114, armature 104 and the slip ring 105, it is understood that these components may not be necessary for movement of the brush 122 and piston 140. Rather, these components have been referred to only to describe opposing ends of the axis (A) as illustrated in FIG. 1. Embodiments of the present disclosure encompass retractable contact assemblies in which no retainer 114 and no armature 105 are provided.

While springs 145 and 130 have been described in FIG. 1 as providing a biasing force to the piston 140 and the brush 122, respectively, embodiments of the present disclosure encompass any type of biasing mechanism, such as flexible belts, sealed fluid reservoirs, etc. In addition, while threads 138 and 113 have been provided as examples of fixing mechanisms, embodiments of the present disclosure encompass any type of fixing mechanism, including welds, adhesives and latches. The seals 151, 152 and 153 may be made of any material, such as elastic materials, rubber, polymers, polytetrafluoroethylene (Teflon™), or any other material capable of creating a fluid-tight seal.

Figure 2:
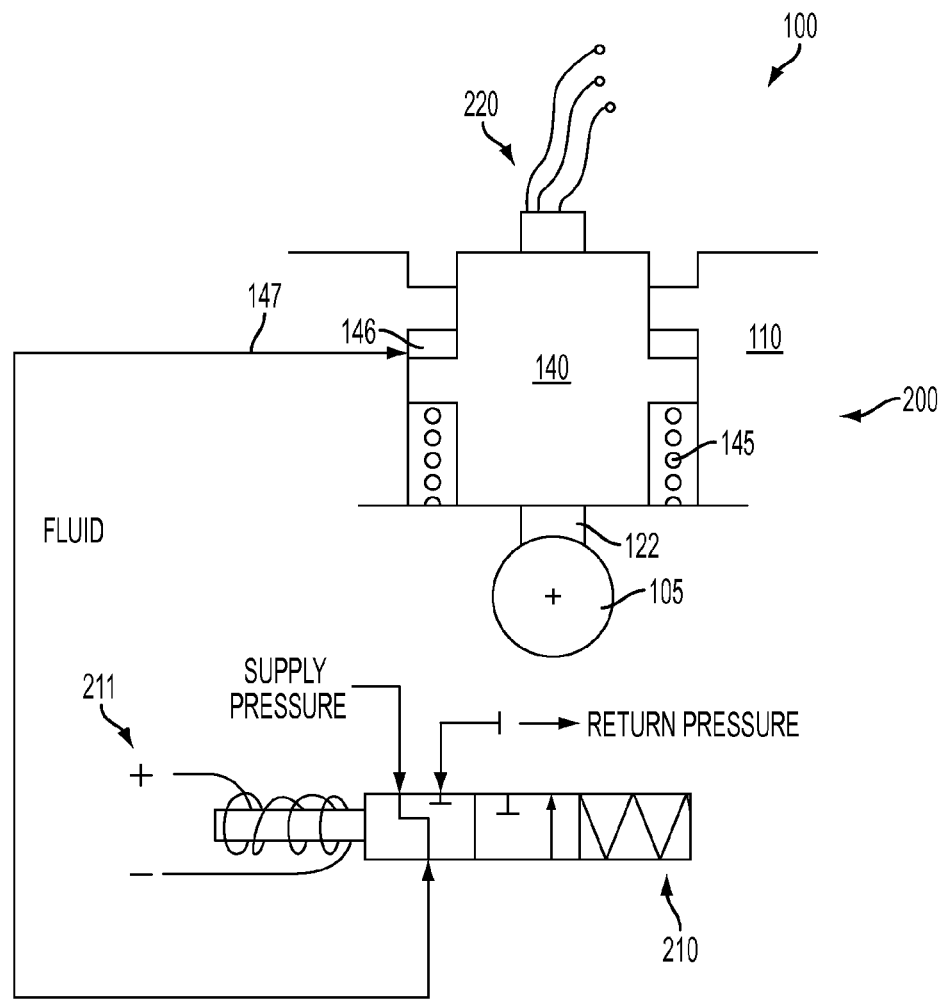
FIG. 2 illustrates a system for controlling the retractable brush according to an embodiment of the present disclosure.

FIG. 2 illustrates a fluid pressure system 200 according to one embodiment. The system 200 includes the retractable contact assembly 100 including the outer casing 110 and the piston 140 defining a cavity 146. An electrical connector 220 may provide electricity to the brush 122 and the slip ring 105. A fluid conduit 147 supplies fluid to the cavity 146 to actuate the piston 140, as described previously. Fluid to the cavity 146 may be controlled by a solenoid valve 210 or any other means or mechanism for adjusting and controlling a fluid supplied to the cavity 146. The solenoid valve 210 may be controlled, for example, by adjusting a power level applied to electrical terminals 211.

Figure 3:
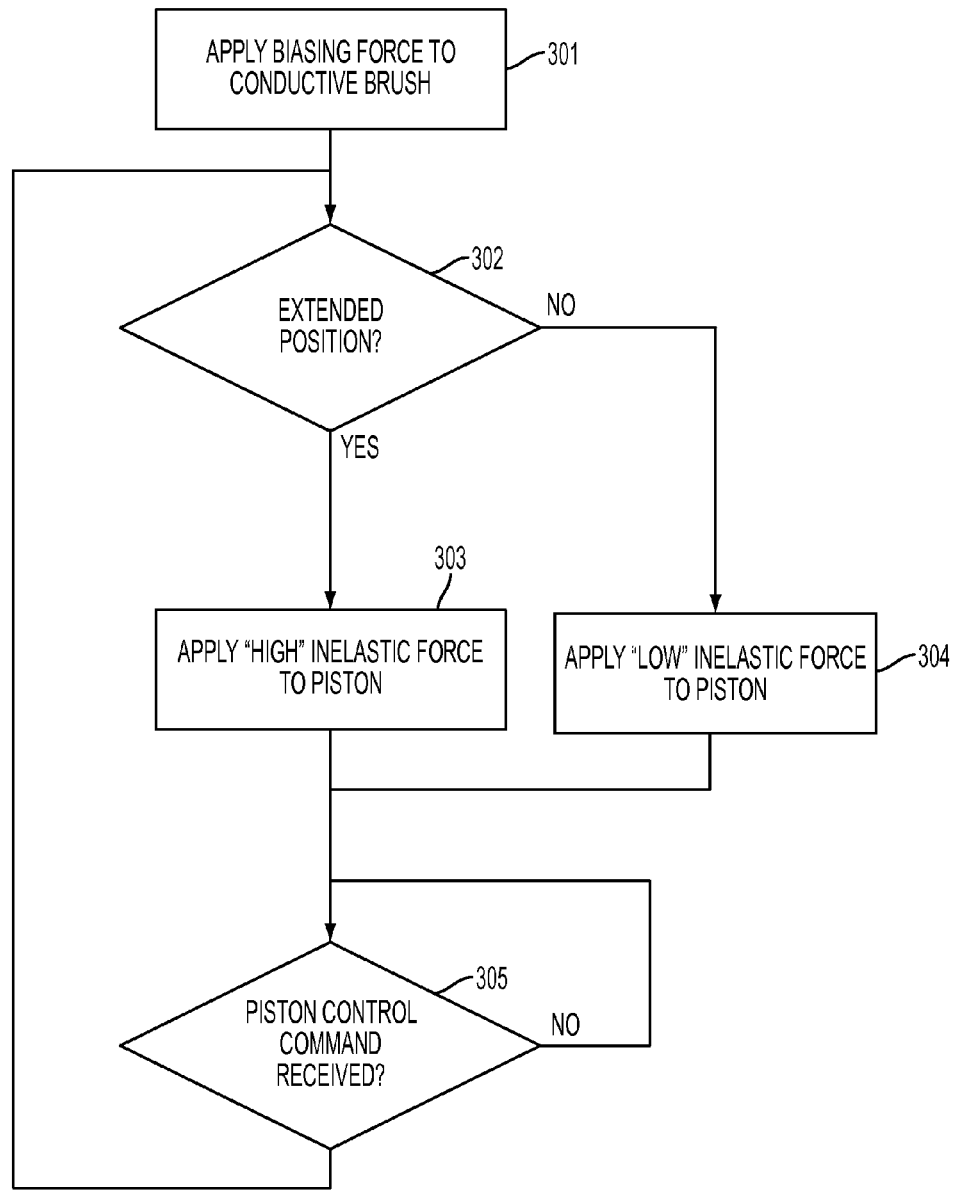
FIG. 3 is a flow diagram illustrating a method for controlling a retractable brush according to one embodiment.

FIG. 3 is a flowchart illustrating a method for controlling a position of a retractable contact assembly. In block 301, a biasing force is applied to a conductive brush. The biasing force may be an elastic force, such as a force provided from a spring or other elastic device or mechanism. The conductive brush may be located within a piston, so that the biasing force is applied to the conductive brush with respect to the piston. For example, one end of a spring may be fixed with respect to the piston and an opposite end may be connected to the conductive brush.

In block 302, it is determined whether a command is received to control the contact assembly to be in the extended position. If so, a predetermined high inelastic pressure is applied to the piston in block 303 to place the piston in the extended position, corresponding to a brush being positioned against a slip ring. For example, a hydraulic pressure may be increased or maintained at a high level in a cavity between the piston and a casing.

On the other hand, if it is determined that no command is received to place the contact assembly in the extended position, or if a command is received to retract the assembly, a predetermined low inelastic pressure is applied to the piston in block 304. For example, a hydraulic pressure may be decreased or maintained at a low level in the cavity between the piston and the casing. Then, in block 305 it is determined if another command has been received to control a position of the piston. If not, the piston is maintained in its present position. If it is determined that another command has been received, then the process proceeds to block 302 to determine the type of command received.

While FIG. 3 illustrates a method of moving a piston (i.e., an "in" or "retracted" position and an "out" or "extended" position), embodiments of the disclosure also encompass a method in which a position of a piston is monitored and the inelastic force applied to the piston is adjusted based on the detected position.

Figure 4:
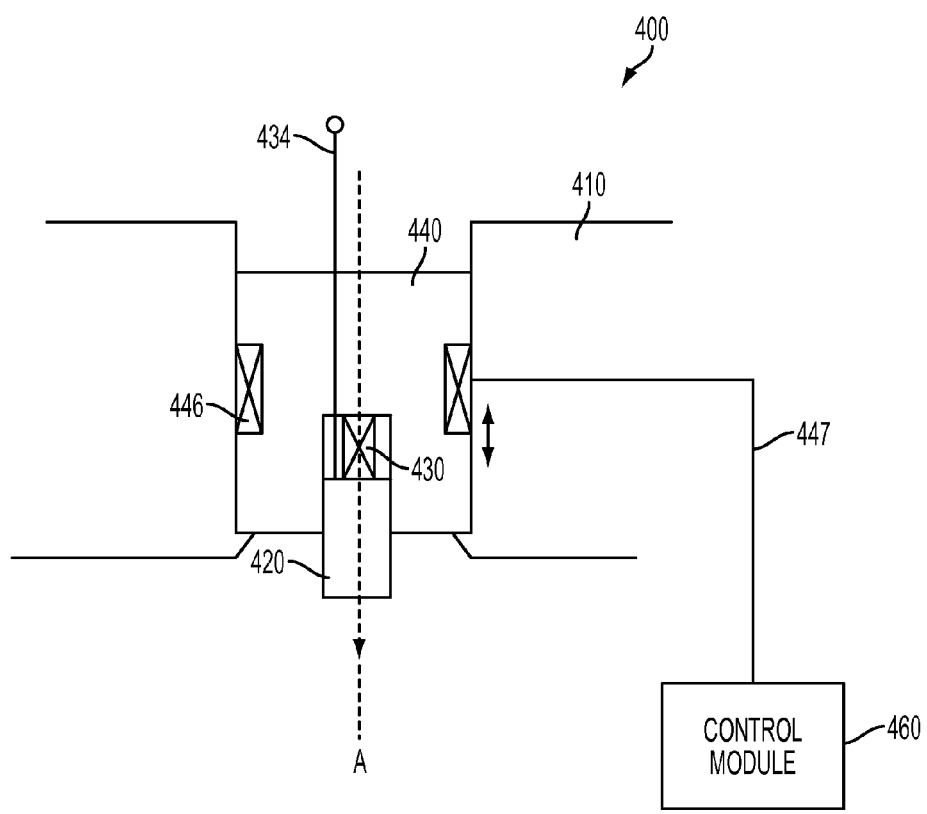
FIG. 4 illustrates a system for controlling a retractable contact according to one embodiment.

In addition, while an example of a retractable contact assembly 100 has been provided according to one embodiment, embodiments of the present disclosure are not limited to the configurations illustrated in FIGS. 1 and 2, and a retractable contact assembly according to embodiments of the present disclosure may encompass any assembly configured to provide an elastic force to a contact and an inelastic force to a piston in which the contact is installed or located to facilitate retraction of the piston and contact. FIG. 4 illustrates a diagram of a retractable contact assembly 400 according to an embodiment of the present disclosure. While the retractable contact assembly 100 of FIG. 1 is one example of a retractable contact assembly 400, the retractable contact assembly 400 is not limited to the particular structures described in FIG. 1.

The retractable contact assembly 400 includes an outer housing 110, and a piston 440 located within the outer housing 110 and slideable in an axial direction A within the outer housing 110. The position of the piston 440 may be adjusted by one or more piston position adjustment devices 446. In one embodiment, as illustrated in FIG. 1, the piston position adjustment devices 446 may include protrusions on the outer housing 410 and the piston 440 to control the position of the piston 440 by hydraulics. However, in other embodiments, the piston position adjustment devices 446 may be electrical position control devices, such as coils and magnetic stators, motors or any other positioning devices. In embodiments of the present disclosure, the piston position control devices 446 are configured to provide a static or inelastic adjustable force to the piston 440. In the present description and claims, the piston position control devices 446 may also be referred to as inelastic-force generating devices. In the present specification and claims, an elastic force is defined as a force generated by an elastic-force generating device, such as a spring, which exerts a force when a force is exerted against it and has a tendency to return to a resting position when no force is exerted against it. In contrast, an inelastic force is defined as a force that may be generated by a device, such as hydraulics or an electric motor, that does not have a tendency to return to a particular rest position. Instead, the level of the inelastic force may be adjusted to be maintained at a plurality of different levels, such as by increasing a voltage to an electric motor or increasing a fluid pressure of a hydraulic system. The level of adjustment may be controlled by any user, device or system, such as a computer, mechanical system, human operator or any other user, device or system.

The piston position adjustment devices 446 may be controlled by a control module 460 via a control line 447. The control module 460 may be a solenoid valve, as in FIG. 2, programmable logic, processing circuitry, or any other type of control device or circuitry capable of controlling the position adjustment devices 446. Since the piston position control devices provide a static or inelastic force, maintaining a constant output from the control module 460, such as a constant fluid pressure or a constant voltage level, maintains the piston position in a same position.

The retractable contact assembly 400 also includes a movable contact 420 located in an opening in the piston 440. In one embodiment, the contact 420 is an electrical contact or a conductive contact, and power may be supplied to the contact 420 via a power line 434. In another embodiment, power may be provided from the contact 420 to the power line 434. An elastic force biasing device 430, such as a spring, provides an elastic force to the contact 420 in the axial direction A. One end of the elastic force biasing device 430 may be connected to, or fixed with respect to, the piston 440, and the other end may be connected to the contact 420. Accordingly, the control module 460 may control a position of the piston 440 via the piston position adjustment devices 446 to move the piston 440 and the contact 420 along an axis A. In one embodiment, moving the piston 440 in a first axial direction places the contact 420 in contact with a device, such as the armature 105 of FIG. 1, and moving the piston 440 in the opposite axial direction retracts the contact 420 from contact with the device. In one embodiment, when the contact 420 is in contact with a device, the elastic force biasing device 430 maintains a level of force of the contact 420 against the device at a substantially constant level.

Embodiments of the present disclosure provide a retractable contact, where the contact is retractable by an inelastic force and maintained in contact with a surface by an elastic biasing force. In one embodiment, the contact is a conductive brush brought into contact with an armature, such as a conductive ring. In one embodiment the conductive ring is configured to rotate and supply power to devices that also rotates. For example, in one embodiment, the conductive ring is a ring on or in a rotor shaft, and the conductive brush contacts the ring to provide power to devices on rotor blades connected to the rotor shaft. In one embodiment, the devices are de-icing devices. In such an embodiment, since rotor blades do not need to be constantly de-iced, the piston may be moved to a retracted position to move the contact away from the ring when de-icing is not needed. Embodiments of the present disclosure encompass any electrical system where a constant electrical contact is not needed. Embodiments of the present disclosure further encompass electrical systems where a constant electrical contact is generally needed or desired, but where an occasional retraction of the contact is required.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A retractable contact assembly, comprising:
    an outer casing having a first opening;
    a piston located in the first opening of the outer casing and moveable axially within the first opening, and the piston having a second opening;
    an inelastic-force generating device configured to control an axial position of the piston among an extended position and a retracted position;
    a contact located in the second opening of the piston and movable axially in the second opening of the piston; and
    an elastic-force biasing device configured to provide an elastic force to the contact in an axial direction outward from the second opening.

2. The retractable contact assembly of claim 1, wherein the contact is a conductive brush.

3. The retractable contact assembly of claim 1, wherein the inelastic-force generating device is a hydraulic force generating device configured to supply a hydraulic fluid to the first opening in the outer casing to adjust a pressure exerted against the piston to control the axial position of the piston among the extended position and the retracted position.

4. The retractable contact assembly of claim 3, wherein the outer casing includes a first protrusion on one side of a fluid supply conduit,
    the piston includes a second protrusion on an opposite side of the fluid supply conduit, the first and second protrusions define a cavity, and
    the inelastic force is generated to move the piston axially in a first direction corresponding to an extended state of the contact by increasing a pressure of the hydraulic fluid in the cavity.

5. The retractable contact assembly of claim 4, further comprising at least one spring configured to provide a biasing force to the piston relative to the outer casing in a second direction opposite the first direction.

6. The retractable contact assembly of claim 4, wherein the outer casing further includes a third protrusion, the first and third protrusions defining a first annular groove,
    the piston further includes a fourth protrusion, the second and fourth protrusions defining a second annular groove,
    ends of the first and third protrusions are located adjacent to an outer surface of the piston,
    ends of the second and fourth protrusions are located adjacent to the outer casing, and
    the retractable contact assembly further includes a first sealing ring in the first groove to form a fluid-tight seal between the piston and the outer casing, and a second sealing ring in the second groove to form a fluid-tight seal between the piston and the outer casing.

7. The retractable contact assembly of claim 1, wherein the inelastic-force generating device is an electric motor.

8. The retractable contact assembly of claim 1, wherein the elastic-force biasing device is a spring.

9. The retractable contact assembly of claim 1, wherein the contact includes a third opening, and
    the retractable contact assembly further comprises a pin extending through the third opening and fixed with respect to the piston to limit a range of axial movement of the contact.

10. A contact position control system, comprising:
    a rotating armature;
    a retractable contact assembly including an outer casing, a piston movable axially within the outer casing, and a contact movable axially within the piston, the contact biased towards the rotating armature by an elastic-force biasing device; and
    an inelastic-force generating device configured to provide an inelastic force to the piston to control an axial position of the piston with respect to the outer casing among an extended axial position and a retracted axial position.

11. The contact position control system of claim 10, wherein the retractable contact is a conductive brush;
    the rotating armature includes a conductive ring; and
    the conductive brush is configured to contact the rotating armature based on positioning the conductive brush in the extended position by the piston and the inelastic force generating device; and
    the conductive brush is maintained in contact with the armature by the elastic-force biasing device.

12. The contact position control system of claim 10, wherein the elastic-force biasing device is a spring connected to the piston at one end and to the contact at an opposing end.

13. The contact position control system of claim 10, wherein the inelastic-force generating device includes a hydraulic valve configured to adjust a pressure of a fluid against the piston to supply an inelastic force to the piston.

14. The contact position control system of claim 10, wherein the contact is a conductive contact, and
    the contact position control system further comprises an electrical supply connected to the contact and configured to provide a predetermined level of electricity to the contact.

15. A method of controlling a position of a contact located partially within an opening of a piston, comprising:

providing an elastic force to bias the contact toward a first axial direction, the contact located partially within the opening of the piston and moveable axially within the opening of the piston; and providing an inelastic force to move the piston axially within an opening of an outer casing between an extended position and a retracted position.

16. The method of claim 15, wherein moving the piston to the extended position comprises generated a predetermined "high" level of inelastic force to the piston, and moving the piston to the retracted position comprises generating a predetermined "low" level of inelastic force to the piston.

17. The method of claim 15, wherein the contact is a conductive contact, and the method further comprises providing an electrical current to the contact to provide the electrical current to the armature.

18. The method of claim 15, wherein providing the inelastic force includes increasing a pressure of fluid in contact with the piston to move the piston axially within the opening.

19. The method of claim 15, further comprising providing an elastic force to bias the piston axially toward the retracted position.

* * * * *